United States Patent [19]
van der Lely

[11] 4,183,412
[45] Jan. 15, 1980

[54] ROTARY HARROWS

[76] Inventor: Cornelis van der Lely, 7, Bruschenrain, Zug, Switzerland

[21] Appl. No.: 720,772

[22] Filed: Sep. 7, 1976

Related U.S. Application Data

[60] Continuation of Ser. No. 580,906, May 27, 1975, abandoned, which is a division of Ser. No. 320,873, Jan. 4, 1973, Pat. No. 3,897,831.

[30] Foreign Application Priority Data

Jan. 5, 1972 [NL] Netherlands ............... 7200086

[51] Int. Cl.² ........................................... A01B 33/14
[52] U.S. Cl. .............................. 172/59; 172/96
[58] Field of Search ........... 172/59, 111, 110, 705–711, 172/264–668, 96; 56/295, 289; 403/111, 113, 120, 117

[56] References Cited

U.S. PATENT DOCUMENTS

| | | | |
|---|---|---|---|
| 216,343 | 6/1879 | Odell | 403/113 |
| 764,365 | 7/1904 | Mercer | 172/96 |
| 2,162,648 | 6/1939 | Slusher | 403/111 X |
| 2,164,233 | 6/1939 | Dobbs | 403/111 X |
| 3,115,190 | 12/1963 | Listiak | 172/59 X |
| 3,139,049 | 6/1964 | Brown | 172/96 X |
| 3,724,182 | 4/1973 | Long et al. | 56/289 X |
| 3,774,688 | 11/1973 | van der Lely et al. | 172/59 X |

FOREIGN PATENT DOCUMENTS 79658  11/1962  France ..................... 172/709

*Primary Examiner*—Paul E. Shapiro
*Attorney, Agent, or Firm*—Mason, Mason and Albright

[57] ABSTRACT

A rotary harrow has soil working members that are driven to rotate on upwardly extending shafts. Each member has a horizontal central support, and an arm pivoted at each opposite end of the central support. A tine is fastened to the outer end of each arm and a soil working portion thereof extends down to work the soil upon rotation of the soil working members. A helical spring on each pivot extends to stops on the central support and the corresponding arm to bias that arm with tine to a forward operative position. Upon striking an obstacle, the tine and arm can pivot rearwardly and the spring urges same back to operative position when the obstacle is passed.

6 Claims, 3 Drawing Figures

ROTARY HARROWS

This application is a continuation of Ser. No. 580,906 filed May 27, 1975, now abandoned, which is a division of Ser. No. 320,873 filed Jan. 4, 1973 now Pat. No. 3,897,831.

According to the invention, there is provided a rotary harrow of the kind set forth, wherein said downwardly extending soil-working portion is hingeably mounted to the shaft of the corresponding soil working member.

Figure 1:
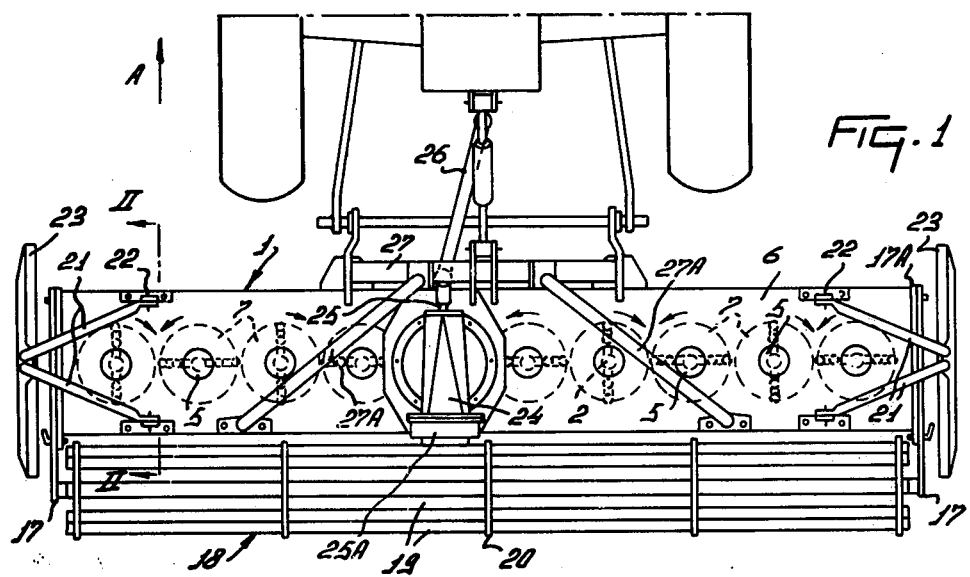
Figure 2:
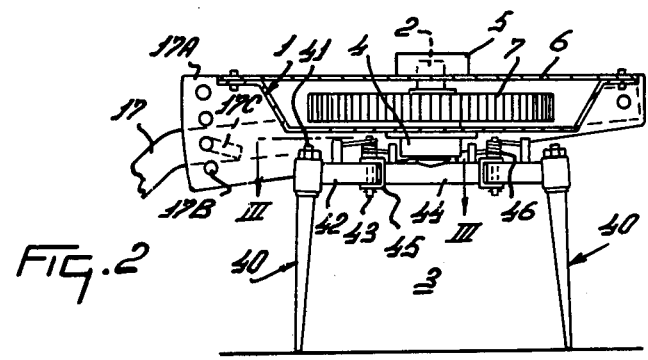
Figure 3:
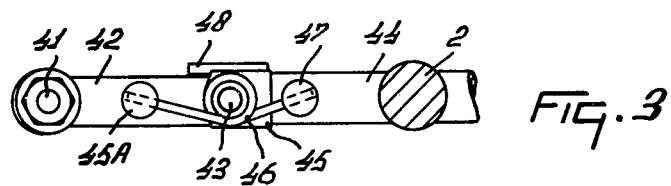

For a better understanding of the invention, and to show how the same may be carried into effect, reference will now be made, by way of example, to the accompanying drawings, in which:

FIG. 1 is a plan view of a rotary harrow in accordance with the invention mounted at the rear of an agricultural tractor, FIG. 2 is a section to an enlarged scale taken on the line II—II of FIG. 1, and FIG. 3 is a section, taken on the line III—III of FIG. 2.

Referring to the drawings, the rotary harrow which is illustrated has a frame which is comprised principally by a frame portion 1 that extends substantially horizontally perpendicular to the intended direction of operative travel of the harrow that is indicated by an arrow A in FIG. 1 of the drawings, said frame portion 1 being in the form of a hollow sheet iron beam or casing. The frame portion 1 rotatably supports a plurality of soil working members or rotors 3 that are disposed side-by-side in a single row and of which it is preferred that there should be at least ten, as illustrated. Each soil-working member or rotor 3 is rotatable about the axis of a corresponding upwardly extending shaft which is preferably a vertical or substantially vertical shaft. Each shaft 2 is spaced apart from its neighbour, or from each of its neighbours, by a distance of substantially 25 centimeters, its lower and upper ends being journalled in corresponding lower and upper bearings. The lower bearings 4 are supported in recesses of the bottom plate of the frame portion 1 while the upper bearings 5 are secured to a top plate 6 by which the upper surface of the frame portion 1 is closed. Each shaft 2 is provided, inside the hollow frame portion 1 and between the corresponding bearings 4 and 5, with a corresponding straight- or spur-toothed pinion 7 and it will be seen from the drawings that each pinion 7 has its teeth in mesh with those of its neighbour, or both of its neighbours.

Each soil-working member or rotor 3 has two tines 40 whose upper fastening portions 41 are arranged in holders carried by arms 42 that are pivotable relative to a central tine support 44. The opposite ends of the tine support 44 are formed with forked brackets 45 and the radially inner ends of the arms 42 are turnably mounted between the limbs of said brackets 45 by substantially vertical pivot pins 43 that extend parallel to the longitudinal axes of the shafts 2. The pins 43 extend upwardly beyond the upper limbs of the corresponding brackets 45 and are surrounded by helical springs 46 that bear between stops 45A mounted on top of the arms 42 and stops 47 mounted on top of the tine support 44. The springs 43 are so arranged as to tend to turn the arms 42 against corresponding stop plates 48 carried by the support 44 alongside the pivot pins 43.

The tines may have any desired cross-sectional configuration. The tines may, for example, be of circular or angular cross-section and, when an angular cross-section is provided, grooves may be formed to extend longitudinally of the tines in at least some of the sides of said angular cross-section. The sides of the angular cross-section with such a construction are preferably of dissimilar lengths. As a further alternative, the tines may be replaced by knife-edged soil engaging members.

Each of the opposite lateral sides or ends of the frame portion 1 has a corresponding arm 17 turnably connected to its leading extremity by a substantially horizontal pivot, said arms 17 being turnable upwardly and downwardly alongside generally sector-shaped plates 17A that are fastened to the frame portion 1. Each plate 17A has a curved row of holes 17B formed along its rearmost edge with respect to the direction A, each of said holes 17B being at the same distance from the corresponding substantially horizontal pivot so that a single hole through the neighbouring arm 17 can be brought into register with any chosen one of the holes. Horizontal locking pins 17C are provided for entry through the single holes in the arms 17 and through chosen holes 17B to maintain the arms 17 in corresponding angular settings about their pivotal connections with the frame portion 1. The downwardly bent-over rear ends (with respect to the direction A) of the two arms 17 rotatably carry a supporting and soil compression member in the form of a roller 18. The soil-engaging periphery of the roller 18 is afforded principally by a plurality of elongated tubular elements 19 that are regularly spaced apart from one another around the axis of rotation of the roller by being entered through peripheral openings in five regularly spaced substantially vertical support plates 20 that are of cicular or substantially circular configuration. Each element 19 extends substantially parallel to a central shaft (not visible) affording the axis of rotation of the roller 18 but it is possible, if desired, to wind the elements 19 helically around the axis of said central shaft to some extent. It is preferred that each tubular element 19 should be of substantially circular cross-section and that it should be entered with some clearance through the peripheral holes in the plates 20 by which it is supported.

Plates 23 that are normally substantially vertically disposed are located at short distances beyond the opposite lateral ends of the row of soil working members or rotors 3. Each plate 23 is connected by a corresponding pair of arms 21 and substantially horizontal pivots 22 to brackets rigidly secured to the top plate 6 of the frame portion 1 alongside the front and rear edges of that plate. Each pair of pivots 22 affords a corresponding axis that extends substantially parallel to the direction A and it will be evident from the drawings that the plates 23 can turn upwardly and downwardly about said axes to match undulations in the surface of the soil over which their lowermost edges will slide when the harrow is in use. When the harrow is undergoing inoperative transport, the plates 23 can be turned upwardly about the axes afforded by the pivots 22 through substantially 180° to bring them to inverted positions in which they lie above the top plate 6 of the frame portion 1.

The left-hand one (as viewed in the direction A) of the central pair of soil working members or rotors 3 has its shaft 2 extended upwardly into a gear box 24 that is mounted on top of the frame portion 1 and that has a rotary input shaft 25 projecting forwardly therefrom in substantially the direction A. The rotary input shaft is splined or otherwise keyed for connection to the power take-off shaft of an agricultural tractor or other operating vehicle by way of an intermediate telescopic transmission shaft 26 of known construction having universal joints at its opposite ends. Such an arrangement is shown in outline in FIG. 1 of the drawings. The gear box 24 comprises an upper substantially horizontal shaft that is driven from, or integral with, the rotary input shaft 25 and a lower relatively parallel shaft which transmits rotation to the aforementioned extension of one of the shafts 2 by way of inter-meshing bevel pinions. The rearmost ends of the two parallel shafts both extend into a change-speed gear 25A which contains meshing pinions of different sizes which pinions can preferably be interchanged and/or exchanged for at least one further pair of pinions to enable different speeds of rotation of the shafts 2 to be attained in respect of a constant speed of rotation of the input shaft 25. The change-speed gear 25A has a dirt-excluding cover which cab be temporarily removed when the pinions beneath it are to be lubricated, interchanged or exchanged. The front of the frame portion 1 with respect to the direction A is provided with a generally trangular coupling member 27 that is adapted for connection in a known manner to the three-point lifting device or hitch of an agricultural tractor or other operating vehicle in the manner that can be seen in outline in FIG. 1 of the drawings. Strengthening tie bars 27A extend between an upper region of the coupling member 27 and the top and near of the frame portion 1.

In the use of the rotary harrow that has been described, it is moved over a field in the direction A by the agricultural tractor shown in FIG. 1 of the drawings or some other operating vehicle, the soil working members or rotors 3 being rotated about the axes of the corresponding shafts 2, in opposite directions as regards neighbouring soil working members or rotors 3, the rotation being derived from the power take-off shaft of the tractor or other operating vehicle by way of the telescopic transmission shaft 24, the input shaft 25, the gear box 24, the change-speed gear 25A and the aforementioned upward extension (not visible) of one of the shafts 2. Each soil working member or rotor 3 should rotate at a speed of not less than substantially 400 revolutions per minute and it is preferred that said speed should be substantially 500 revolutions per minute so that a broad strip of land can be completely tilled in one traverse of the harrow by the single tines of the individual soil working members or rotors 3. As previously mentioned, the narrow strips of land worked by the individual soil working members or rotors 3 overlap one another due to the diameters of the circular paths traced by the tips of the tines 11 being greater than the distances between the shafts 2.

If, during the use of the rotary harrow, one of the tines 40 should meet a large stone or other obstacle, that tine can deflect rearwardly about the corresponding pivot 43 with respect to the direction of rotation of the corresponding soil working member or rotor. As soon as the obstacle has been moved or avoided, the displaced tine 40 and the arm 42 by which it is carried will be moved back to a position similar to that illustrated in FIG. 3 under the action of the corresponding strong spring 46 in which position the arm 42 again bear against the corresponding stop plate 48.

The speed of rotation of the shafts 2 can be varied between a minimum of substantially 400 revolutions per minute and a preferred value of substantially 500 revolutions per minute by appropriate adjustments of the change-speed gear 25A as briefly described above. It will be remembered that such adjustments vary the speeds of rotation of the shafts 2 without requiring an alteration in the speed of rotation of the input shaft 25. A speed of rotation of the shafts 2 appropriate to the nature and condition of the soil being worked can accordingly be chosen without difficulty. The depth of penetration of the soil working portions of the tines into the soil is governed principally by the level of the axis of rotation of the roller 18 relative to the remainder of the harrow and such level can be adjusted as required by entering the locking pins 17C through appropriate holes 17B in the plates 17A.

What we claim is:

1. A rotary harrow comprising a plurality of soil-working members rotatably mounted on a frame and said members being positioned in a row that extends transverse to the normal direction of travel of said harrow, said soil-working members each being rotatable about an upwardly extending shaft and driving means connected to rotate said member about an axis defined by said shaft, said member comprising an elongated substantially horizontal support with a respective arm connected adjacent each outer end thereof and downwardly extending tine means depending from said arm, said arm being laterally spaced from said shaft and the tine means on arms of adjacent soil working members being normally positioned to work overlapping paths of soil, each arm being interconnected to its corresponding support through hinge means, said hinge means comprising an upwardly extending axis and said tine means being deflectable about the axis of said hinge means with respect to said shaft responsive to soil conditions, said tine means maintaining a substantially constant working depth during deflection thereof.

2. A harrow as claimed in claim 1, wherein the axis of said hinge means is a pin that extends substantially parallel to said shaft.

3. A harrow as claimed in claim 2, wherein a tine of said tine means is mounted in a holder at the outer side of said arm and a spring on that arm normally biases the arm and tine radially outwardly with respect to said shaft.

4. A harrow as claimed in claim 3, each outer side of said support has a stop plate and said spring biases the respective arm into contact with said stop plate.

5. A harrow as claimed in claim 3, wherein said spring is a helical spring mounted on said pin, the opposite ends of said spring bearing on stop members mounted on top of said arm and said support.

6. A rotary harrow comprising a plurality of soil-working members rotatably mounted on a frame and said members being positioned in a row that extends transverse to the normal direction of travel of said harrow, said soil-working members each being rotatable about a respective upwardly extending shaft and driving means connected to rotate said members about corresponding axes defined by their shafts and normally work overlapping paths, each member comprising an elongated horizontal central support, the outer ends of said support being pivoted to corresponding arms, a downwardly extending soil-working tine being mounted adjacent the outer end of each arm and a soil-working portion of said tine being laterally spaced from said shaft, the pivot connection between each arm and the outer portion of said support having an upwardly extending axis that extends substantially parallel to the axis of rotation of the corresponding soil working member and said arm with tine being deflectable about the pivot axis of said connection with respect to the normal direction of rotation of said member responsive to soil conditions, the soil-working portion of each tine maintaining a substantially constant working depth during deflection thereof, and means biasing said arm in normal radial alignment with said support.

* * * * *